(12) United States Patent
Morton

(10) Patent No.: US 6,871,987 B1
(45) Date of Patent: Mar. 29, 2005

(54) RIM ILLUMINATING DEVICE

(76) Inventor: Kenny F. Morton, 2943 N. 9<sup>th</sup> St., Milwaukee, WI (US) 53206

( * ) Notice: Subject to any disclaimer, the term of this patent is extended or adjusted under 35 U.S.C. 154(b) by 0 days.

(21) Appl. No.: 10/107,109

(22) Filed: Mar. 28, 2002

(51) Int. Cl.<sup>7</sup> .................................................. B60Q 1/26
(52) U.S. Cl. ...................................... 362/500; 362/158
(58) Field of Search ................................. 362/191, 500, 362/396, 158, 439

(56) References Cited

U.S. PATENT DOCUMENTS

| | | | | |
|---|---|---|---|---|
| 4,047,150 A | * | 9/1977 | Kelley | 340/84 |
| 4,323,879 A | * | 4/1982 | Kelley | 340/134 |
| 4,430,692 A | * | 2/1984 | Papadakis | 362/500 |
| 4,800,469 A | * | 1/1989 | Leon | 362/72 |
| 4,881,153 A | * | 11/1989 | Scott | 362/500 |
| D332,441 S | * | 1/1993 | Douglas, Jr. | D12/204 |
| 5,683,164 A | * | 11/1997 | Chien | 362/500 |
| 5,785,410 A | * | 7/1998 | Branson, Sr. | 362/153.1 |
| 5,934,784 A | * | 8/1999 | Dion | 362/103 |
| 6,030,106 A | * | 2/2000 | Johnson | 362/500 |
| 6,070,997 A | * | 6/2000 | Duke et al. | 362/500 |
| 6,116,762 A | * | 9/2000 | Kutlucinar | 362/500 |
| 6,135,850 A | * | 10/2000 | Reed | 446/484 |
| 6,224,235 B1 | * | 5/2001 | Parker | 362/190 |
| 6,239,691 B1 | * | 5/2001 | Preisler | 340/321 |
| 6,416,198 B1 | * | 7/2002 | Vanderschuit | 362/101 |
| 6,416,209 B1 | * | 7/2002 | Abbott | 362/506 |

* cited by examiner

*Primary Examiner*—Thomas M. Sember
*Assistant Examiner*—Jacob Y. Choi

(57) ABSTRACT

A rim illuminating device for removably mounting to a rim of a motor vehicle in order to create a visual effect when the motor vehicle is moving. The illuminating device includes a housing that has a first surface and a second surface. A cover is mounted to the first surface of the housing for covering the housing. An illuminating member is mounted to the first surface of the housing for emitting light. A power supply is mounted to the housing and electrically connected to the illuminating member for selectively providing power thereto. A coupling member is mounted to the second surface of the housing for removably mounting the housing to the rim of the vehicle.

6 Claims, 4 Drawing Sheets

RIM ILLUMINATING DEVICE

BACKGROUND OF THE INVENTION

1. Field of the Invention

The present invention relates to illuminating accessories for motor vehicles and more particularly pertains to a new rim illuminating device for removably mount to a rim of a motor vehicle in order to create a visual effect when the motor vehicle is moving.

2. Description of the Prior Art

The use of illuminating accessories for motor vehicles is known in the prior art. More specifically, illuminating accessories for motor vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 6,030,106; U.S. Pat. No. 4,881,153; U.S. Pat. No. 5,683,164; U.S. Pat. No. 4,430,692; U.S. Pat. No. Des. 332,441; U.S. Pat. No. 6,116,762.

While these devices fulfill their respective, particular objectives and requirements, the aforementioned patents do not disclose a new illuminating device for motor vehicles. Conventional devices have included employing lights and power supplies that are independently mountable to a wheel rim and yet electrically connected. Other conventional devices employ complicated assemblies that permit lights to rotate with a wheel rim while a power supply to illuminate the lights is kept stationary. The conventional devices are complicated and difficult to use.

SUMMARY OF THE INVENTION

The general purpose of the present invention, which will be described subsequently in greater detail, is to provide a new illuminating device which has many of the advantages of the illuminating accessories for motor vehicles mentioned heretofore and many novel features that result in a new rim illuminating devices which is not anticipated, rendered obvious, suggested, or even implied by any of the prior art illuminating device, either alone or in any combination thereof.

The inventive device includes a housing that has a first surface and a second surface. A cover is mounted to the first surface of the housing defining an interior of the housing. An illuminating member is mounted to the first surface of the housing for emitting light. A power supply is mounted to the housing and electrically connected to the illuminating member for selectively providing power thereto. A coupling member is mounted to the second surface of the housing for removably mounting the housing to the rim of the vehicle.

There has thus been outlined, rather broadly, the more important features of the rim illuminating device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new rim illuminating device which has many of the advantages of the illuminating accessories mentioned heretofore and many novel features that result in a new illuminating device which is not anticipated, rendered obvious, suggested, or even implied by any of the prior art illuminating device, either alone or in any combination thereof.

Still another object of the present invention is to provide a new rim illuminating device for removably mount to a rim of a motor vehicle in order to create a visual effect when the motor vehicle is moving. In particular, the lights provide a visual effect that makes a motor vehicle appear as though it is floating.

Still yet another object of the present invention is to provide a new illuminating device that unlike the conventional devices is easily mountable and removable from a wheel rim of a motor vehicle.

Even still another object of the present invention is to provide a new illuminating device that provides a user with light if the user needs to work on a flat tire.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
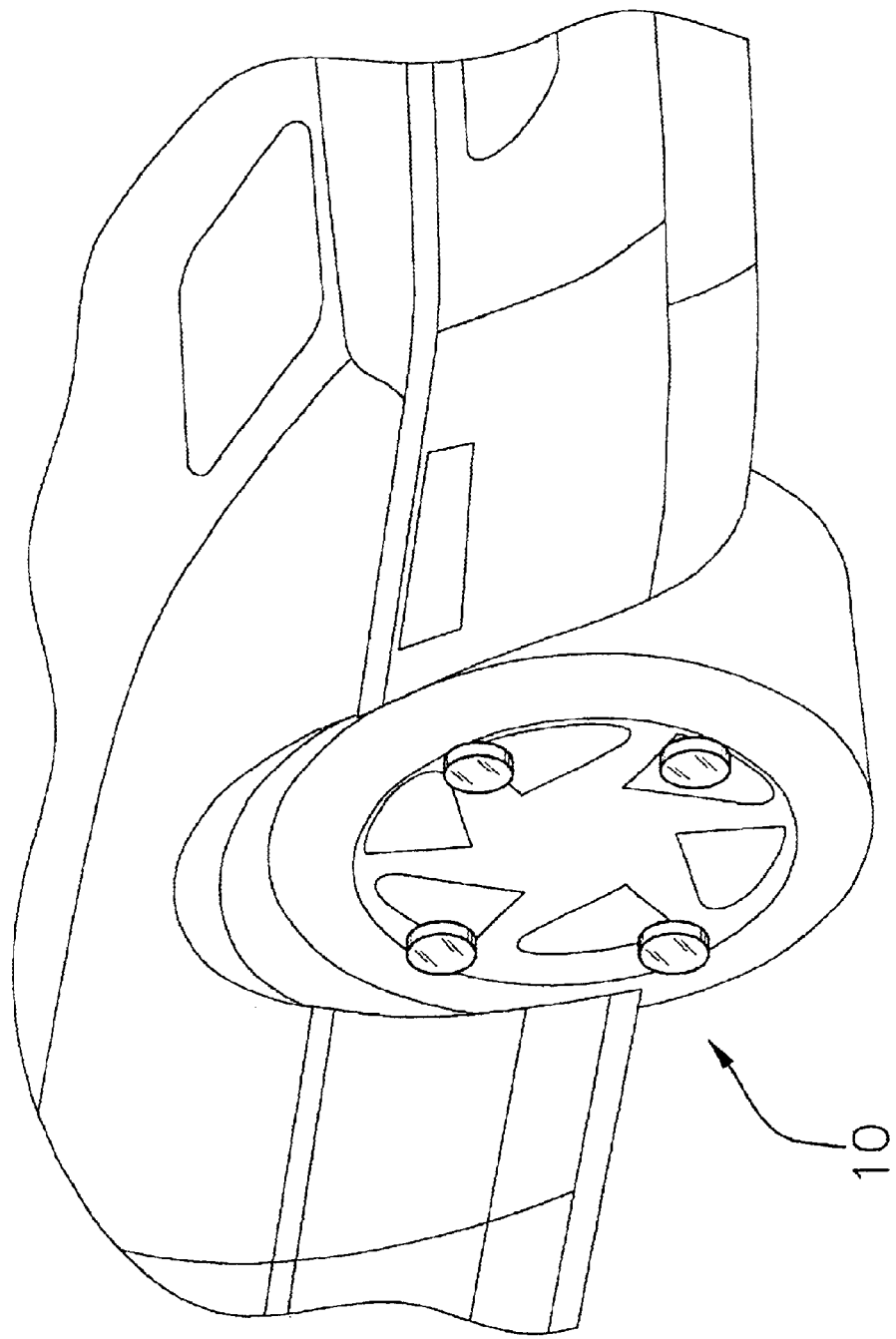
FIG. 1 is a perspective view of a new rim illuminating device according to the present invention and shown in use.

With reference now to the drawings, and in particular to FIGS. 1 through 4 thereof, a new rim illuminating device embodying the principles and concepts of the present invention and generally designated by the reference numeral 10 will be described.

As best illustrated in FIGS. 1 through 4, the rim illuminating device 10 generally comprises a housing 12 that has a first surface 13 and a second surface 14. A cover 20 is removably mounted to the first surface 13 of the housing 12 for covering the first surface 13 of the housing 12. An illuminating member 30 is mounted to the first surface 13 of the housing 12 for emitting light. A power supply 32 is mounted to the housing 12 and is electrically connected to the illuminating member 30 for selectively providing power thereto. A coupling member 40 is mounted to the second surface 14 of the housing 12 for removably mounting the housing 12 to a rim of a motor vehicle.

Figure 4:
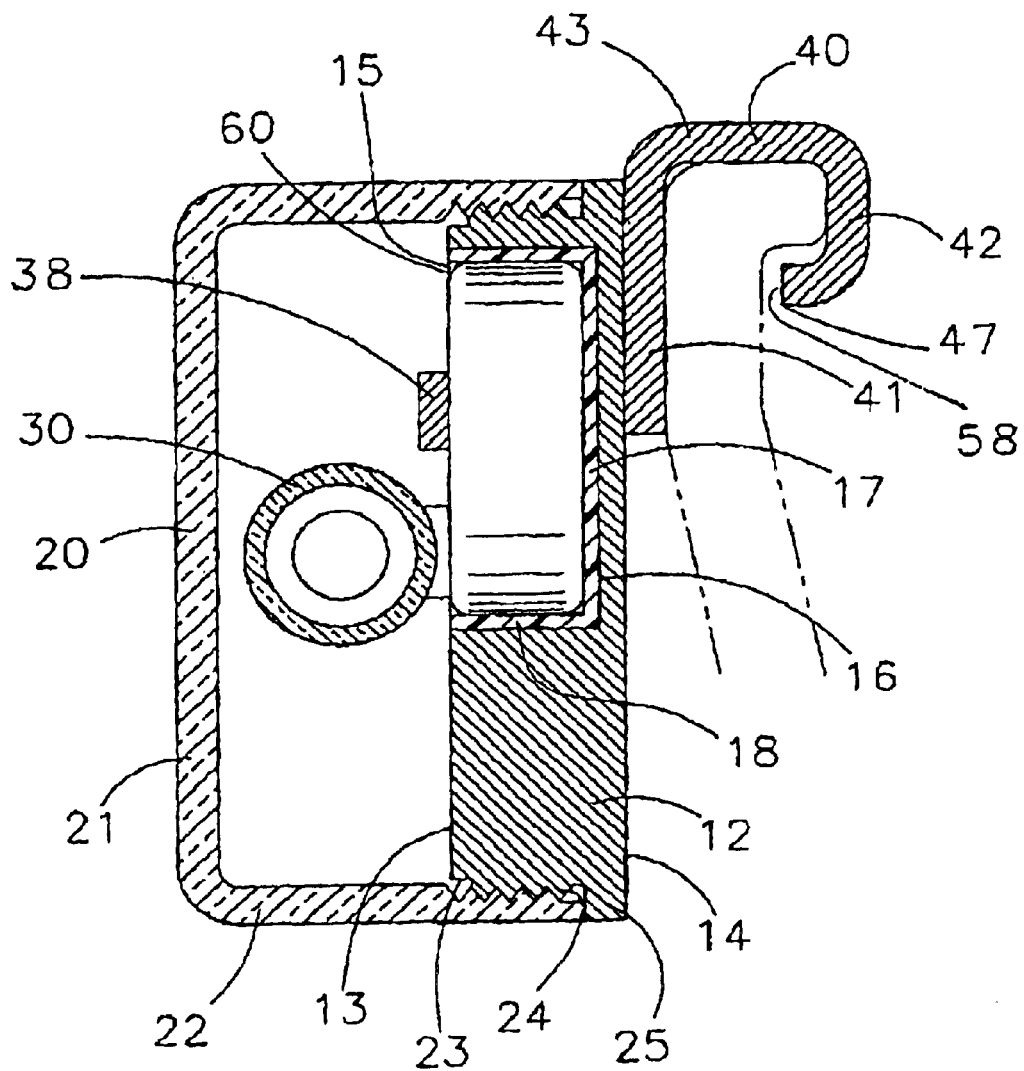
FIG. 4 is a cross sectional view of the present invention taken along line 4—4 of FIG. 2.

As illustrated in FIG. 4, the first surface 13 of the housing 12 may have a cavity 15 extending therein for receiving the power supply 32. The cavity 15 generally extends from the first surface 13 toward the second surface 14 of the housing 12. The cavity 15 may have a generally circular transverse cross section taken substantially parallel to the first surface 13. The cavity 15 may also be positioned generally off center from a central portion of the housing 12.

The housing 12 may comprise a substantially rigid material such as, for example, a chrome or plastic material. However, other materials may also be employed in the manufacture of the housing 12.

In one embodiment of the present invention, as illustrated in FIG. 4, an insulating member 16 may be positioned in the cavity 15. The insulating member 16 may include a bottom wall 17 and a peripheral wall 18 that extends away therefrom. The bottom 17 and peripheral 18 walls may define an inset 60 for receiving the power supply. The insulating member 16 may be mounted to an inner surface of the housing 12 defining the cavity 15. The insulating member 16 insulates the power supply 32 from adverse weather conditions such as rain, snow and cold temperatures. The insulating member 16 may comprise a generally flexible material such as, for example, a rubber material.

As illustrated in FIG. 4, the cover 20 has an end wall 21 and a peripheral wall 22 that extends therefrom. An inner surface of the peripheral wall 22 of the cover 20 is threaded for threadedly engaging a side surface 23 of the housing 12. The side surface 23 of the housing 12 includes a plurality of threads 24 for engaging the cover 20. The cover 20 may comprise a substantially translucent material such as, for example a plastic for permitting light emitted from the illuminating member 30 to pass therethrough.

In one embodiment of the present invention, as illustrated in FIG. 4, the housing 12 may include a lip 25 extending away from the side surface 23. The lip 25 may extend about the housing and may be positioned generally nearer the second surface 14 that the first surface 13 of the housing 12. An edge of the peripheral wall 22 of the cover 20 abuts the lip 25 to prevent rain and debris from entering a juncture between the cover 20 and the housing 12.

In one embodiment of the present invention, the illuminating member 30 may comprise a light bulb. Any conventional light bulb may be employed. The illuminating member 30 may also comprise of various colored light bulbs such as, for example, red, green, and blue. Other colored light bulbs may also be employed.

Figure 2:
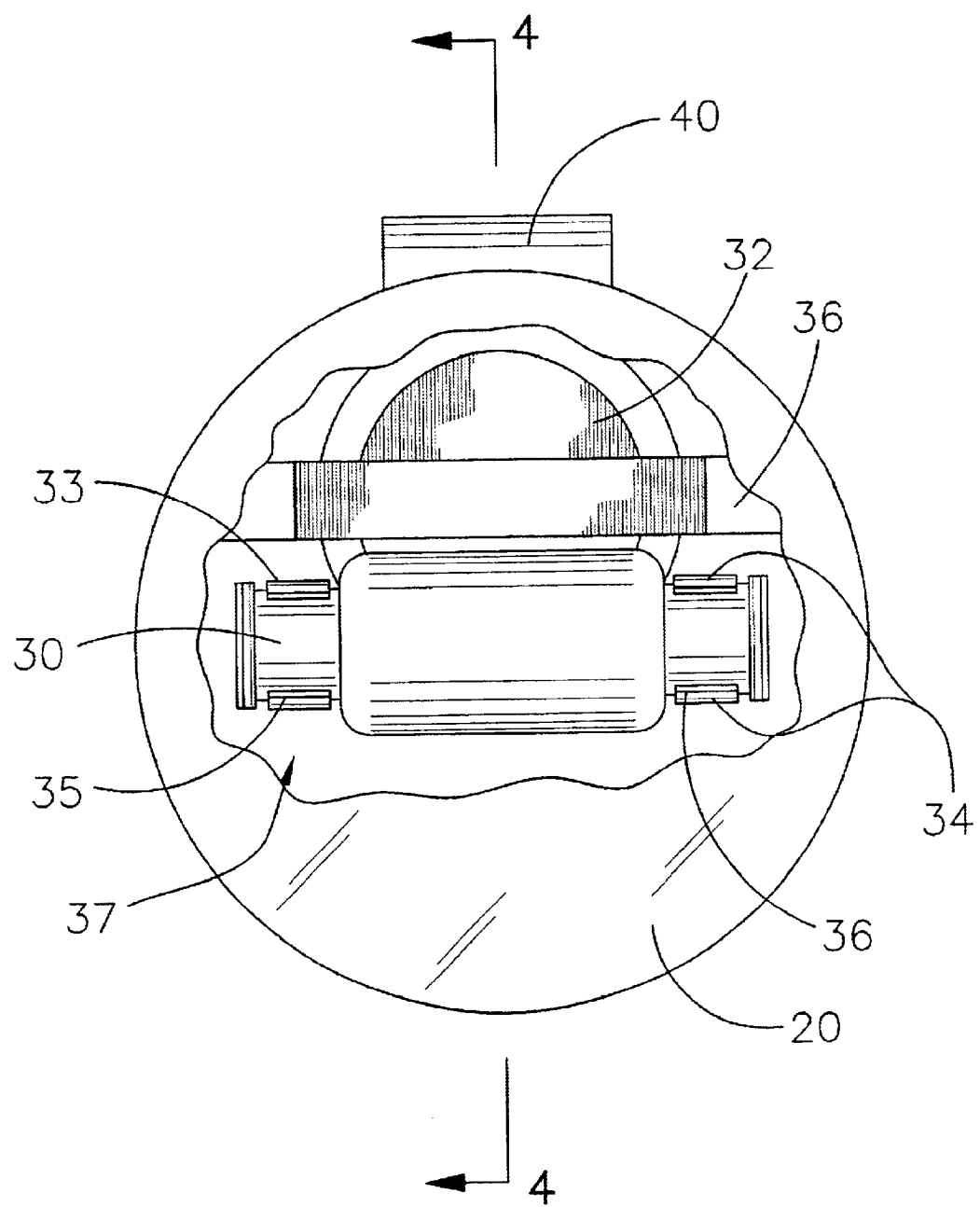
FIG. 2 is a front partial cross sectional view of the present invention showing an illuminating member.

As illustrated in FIGS. 2 and 4, a plurality of spaced contacts 37 may be mounted to and may extend away from the first surface 13. The illuminating member 30 is removably positionable between the plurality of spaced contacts 37. The plurality of spaced contacts 37 preferably comprise an electrically conductive material such as, for example, an aluminum or copper material.

The plurality of spaced contacts 37 may include a pair of first spaced contacts 33 and a pair of second spaced contacts 34. Each of the first spaced contacts 33 may include a generally arcuate end 35 for extending about the illuminating member 30. Bach of the second contacts 34 may also include a generally arcuate end 36 for extending about the illuminating member 30.

As illustrated in FIGS. 2 and 4, a securing member 36 may be mounted to the first surface 13 of the housing 12 and may be removably positionable over the power supply 32 for removably securing the power supply 32 in the cavity 15 extending into the housing 12. In one embodiment of the present invention, the securing member 36 may comprise an elongate strap that has a pair of opposed ends. At least one of the opposed ends is removably couplable to the first surface 13 of the housing 12.

The power supply 32 comprises a battery. In one embodiment of the present invention, the power supply 32 may comprise a watch battery. However, other types of batteries may also be employed.

The coupling member 40 includes a securing portion 41 that is secured to the second surface 14 of the housing 12. She securing portion 41 may have a length that extends generally beyond the side surface 23 of the housing 12. A clamp portion 42 is orientated generally parallel to the securing portion 41 for releasably clamping onto the rim of the vehicle. A coupling portion 43 extends between an end of the coupling portion 43 and the clamp portion 42. The clamp portion 42 may have a free end. The free end may have a lip 58 extending away therefrom and extending toward the housing. As illustrated in FIG. 4, the coupling member 40 has a generally inverted hook transverse cross section taken substantially perpendicular to a longitudinal axis of the coupling member 40.

Figure 3:
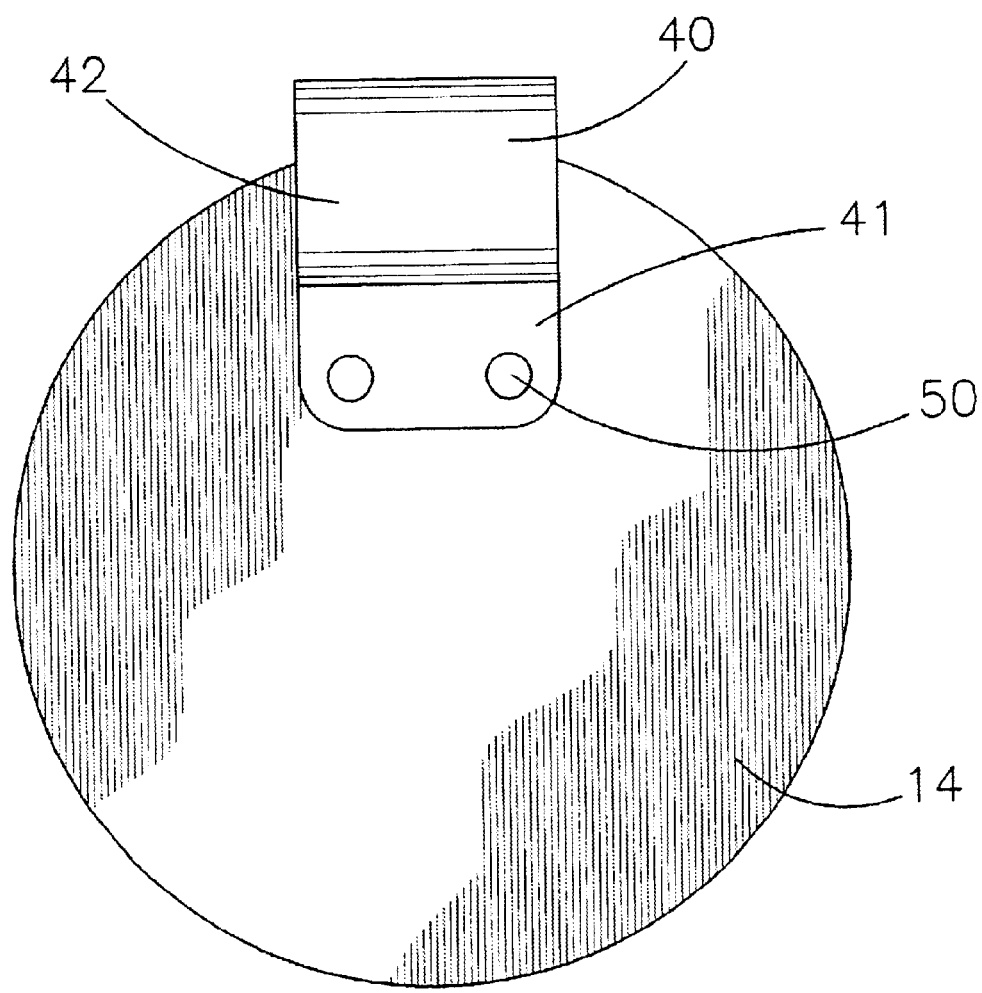
FIG. 3 is a rear elevational view of the present invention.

As illustrated in FIG. 3, a means of fastening 50 the securing portion 41 to the second surface 14 of the housing 12 may be provided. The means of fastening 50 may extend through the securing portion 41 and may extend into the second surface 14 of the housing 12. The means of fastening 50 may comprise rivets. However, other means of fastening may be employed.

In use, the housing 12 is mounted to the rim of the vehicle. The rim of the vehicle is positioned is positioned between the securing portion 41 and the clamping portion 42 of the coupling member 40. The illuminating member 30, powered by the power supply 32 emits light through the cover 20. As the rim of the vehicle rotates the illumination of the rim illuminating member 10 makes the vehicle to appear to be hovering.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the rim illuminating device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rim illuminating device being removably mountable to a rim of a motor vehicle, said device comprising:

a housing having an first surface and a second surface;

a cover being removably mounted to said first surface of said housing;

an illuminating member being mounted to said first surface of said housing for emitting light;

a power supply being mounted to said housing and electrically connected to said illuminating member for selectively providing power thereto, said first surface of said housing has a cavity extending therein for receiving said power supply;

a coupling member being mounted to said second surface of said housing for removably mounting said housing to the rim of the vehicle; and an insulating member having a bottom wall and a peripheral wall extending away therefrom, wherein said bottom and peripheral walls define an inset for receiving said power supply, said insulating member being mounted to an inner surface of said housing defining said cavity, wherein said power supply is insulated from adverse weather conditions.

2. A rim illuminating device being removably mountable to a rim of a motor vehicle, said device comprising:

a housing having a first surface and a second surface;

a cover being removably mounted to said fault surface of said housing;

an illuminating member being mounted to said first surface of said housing for emitting light;

a power supply being mounted to said housing and electrically connected to said illuminating member for selectively providing power thereto, said first surface of said housing has a cavity extending therein for receiving said power supply;

a coupling member being mounted to said second surface of said housing for removably mounting said housing to the rim of the vehicle; and a securing member being mounted to said first surface of said housing and removably positionable over and abutting said power supply for removably securing said power supply in said cavity of said housing wherein said securing member comprises an elongate strap having a pair of opposed ends, at least one of said opposed ends being removably couplable to said first surface of said housing.

3. A rim illuminating device being removably mountable to a rim of a motor vehicle, said device comprising:

a housing having an first surface and a second surface;

a cover being removably mounted to said first surface of said housing;

an illuminating member being mounted to said first surface of said housing for emitting light;

a power supply being mounted to said housing and electrically connected to said illuminating member for selectively providing power thereto; and a coupling member being mounted to said second surface of said housing for removably mounting said housing to the rim of the vehicle, wherein said coupling member includes a securing portion secured to said second surface of said housing, said securing portion having a length extending generally beyond a side surface of said housing, a clamp portion for releasably clamping onto the rim of the vehicle, a coupling portion extending between an end of said securing portion and said clamp portion, said clamp portion having a free end, said free end having a lip extending away therefrom and extending toward said housing, said lip being orientated generally perpendicular to a longitudinal axis of said clamp portion, such that said clamp portion has a generally u-shaped cross-section.

4. The rim illuminating device of claim 3, wherein said coupling member has a generally hook transverse cross section taken substantially perpendicular to a longitudinal axis of said coupling member.

5. The rim illuminating device of claim 3, additionally including a means of fastening said securing portion to said second surface of said housing, said means of fastening extending through said securing portion and into said second surface of said housing.

6. The rim illuminating device of claim 2, further including a coupling member being mounted to said second surface of said housing for removably mounting said housing to the rim of the vehicle, wherein said coupling member includes a securing portion secured to said second surface of said housing, said securing portion having a length extending generally beyond a side surface of said housing, a clamp portion for releasably clamping onto the rim of the vehicle, a coupling portion extending between an end of said securing portion and said clamp portion, said clamp portion having a free end, said free end having a lip extending away therefrom and extending toward said housing, said lip being orientated generally perpendicular to a longitudinal axis of said clamp portion, such that said clamp portion has a generally u-shaped cross-section.

* * * * *